United States Patent
Feuz et al.

(10) Patent No.: US 11,983,613 B2
(45) Date of Patent: *May 14, 2024

(54) INCOGNITO MODE FOR PERSONALIZED MACHINE-LEARNED MODELS

(71) Applicant: Google LLC, Mountain View, CA (US)

(72) Inventors: Sandro Feuz, Zurich (CH); Victor Carbune, Winterthur (CH)

(73) Assignee: GOOGLE LLC, Mountain View, CA (US)

( * ) Notice: Subject to any disclaimer, the term of this patent is extended or adjusted under 35 U.S.C. 154(b) by 224 days.

This patent is subject to a terminal disclaimer.

(21) Appl. No.: 17/545,384

(22) Filed: Dec. 8, 2021

(65) Prior Publication Data

US 2022/0101200 A1   Mar. 31, 2022

Related U.S. Application Data (63) Continuation of application No. 15/805,484, filed on Nov. 7, 2017, now Pat. No. 11,216,745.

(51) Int. Cl.
*G06N 5/02*  (2023.01)
*G06F 9/46*  (2006.01)
(Continued)

(52) U.S. Cl.
CPC .............. *G06N 20/00* (2019.01); *G06F 9/46* (2013.01); *G06N 5/022* (2013.01)

(58) Field of Classification Search
None
See application file for complete search history.

(56) References Cited

U.S. PATENT DOCUMENTS

| | | |
|---|---|---|
| 8,429,103 B1 | 4/2013 | Aradhye |
| 9,195,388 B2 | 11/2015 | Shepherd |

(Continued)

FOREIGN PATENT DOCUMENTS

| | | |
|---|---|---|
| CN | 1647108 | 7/2005 |
| CN | 103635896 | 3/2014 |

(Continued)

OTHER PUBLICATIONS

Ohta et al ("Design and Implementation of Privacy-enhanced Operation History Middleware for Smartphones" 2011) (Year: 2011).*

(Continued)

*Primary Examiner* — Lut Wong (74) *Attorney, Agent, or Firm* — DORITY & MANNING P.A.

(57) ABSTRACT

The present disclosure provides systems and methods for on-device machine learning. In particular, the present disclosure is directed to an on-device machine learning platform and associated techniques that enable on-device prediction, training, example collection, and/or other machine learning tasks or functionality. The on-device machine learning platform can include a mode controller that allows a user to provide data input indicating whether to operate one or more applications on the device in a first collection mode (e.g., permission mode) for storing training examples or a (Continued)

second collection mode for (e.g., incognito mode) for not storing training examples. The training examples can be generated based on user interaction with the one or more applications and used to personalize one or more machine-learned models used by the application(s) by retraining the models using the user-specific training examples.

20 Claims, 7 Drawing Sheets

(51) Int. Cl.
  *G06N 5/022*   (2023.01)
  *G06N 20/00*   (2019.01)

(56) References Cited

U.S. PATENT DOCUMENTS

| | | |
|---|---|---|
| 2010/0312555 A1 | 12/2010 | Plumpe et al. |
| 2013/0174274 A1 | 7/2013 | Friedman et al. |
| 2013/0227352 A1 | 8/2013 | Kumarasamy et al. |
| 2015/0254555 A1 | 9/2015 | Williams, Jr. et al. |
| 2015/0281383 A1* | 10/2015 | Bilinski ............ H04L 67/53 709/202 |
| 2015/0324690 A1 | 11/2015 | Chilimbi et al. |
| 2017/0032257 A1 | 2/2017 | Sharifi et al. |
| 2017/0097996 A1 | 4/2017 | Gullett et al. |

FOREIGN PATENT DOCUMENTS

| | | |
|---|---|---|
| CN | 107209842 | 9/2017 |
| WO | WO 2017/066509 | 4/2017 |

OTHER PUBLICATIONS

Anonymous, "Google AI Blog: Federated Learning: Collaborative Machine Learning Without Centralized Training Data", Apr. 6, 2017, https://ai.googleblog.com/201704/federated-learning-collaborative.html, retrieved Oct. 19, 2018, 8 pages.

International Preliminary Report on Patentability for Application No. PCT/US2018/048668, dated May 22, 2020, 9 pages.

International Search Report and Written Opinion for Application No. PCT/US2018/048668, dated Dec. 6, 2018, 14 pages.

Kidney, Brian et al., "Exploiting Autocorrect to Attack Privacy (Transcript of Discussion)", Jul. 19, 2017, Medical Image Computing and Computer-Assisted Intervention—MICCAI 2015: 18th International Conference, Munich, Germany, Oct. 5-9, 2015, Springer International Publishing, retrieved on Jul. 19, 2017, 10 pages.

McMahan et al., "Federated Learning: Collaborative Machine Learning without Centralized Training Data", Apr. 6, 2017, 4 pages.

McMahan, Brendan et al., "Federated Learning of Deep Networks Using Model Averaging", arXiv.org, Cornell University Library, Ithaca, New York, Feb. 18, 2016, 12 pages.

Shokri et al., "Privacy-Preserving Deep Learning", 53rd Annual Allerton Conference on Communication, Control, and Computing, 2015, Monticello, IL, pp. 909-910.

Machine Translated Chinese Search Report Corresponding to Application No. 2018800443133 on Dec. 28, 2022.

* cited by examiner

INCOGNITO MODE FOR PERSONALIZED MACHINE-LEARNED MODELS

PRIORITY CLAIM

The present application is a continuation of U.S. patent application Ser. No. 15/805,484 having a filing date of Nov. 7, 2017, which is incorporated by reference herein in its entirety for all purposes.

FIELD

The present disclosure relates generally to machine learning. More particularly, the present disclosure relates to an on-device machine learning platform and associated techniques that enable dynamic example collection and training, as well as related machine learning tasks or functionality.

BACKGROUND

In recent years, machine learning has been increasingly used to provide improved services to users of computing devices. In particular, many applications or other computing programs or systems rely on one or more machine-learned models to produce inferences based on input data associated with the program, device, and/or user. The application(s) can use the inference(s) to perform or influence any type of task or service.

One conventional training scheme for solving machine learning problems includes collecting at a centralized location (e.g. a server device) a plurality of training examples from a plurality of computing devices (e.g., user devices such as smartphones). A machine-learned model can then be trained at the centralized location based on the collected training examples.

In addition, in some instances, the trained model can be stored at the centralized location. In order to receive an inference from the model, the user computing device is required to transmit input data to the server computing device over the network, wait for the server device to run the machine-learned model to produce inference(s) based on the transmitted data, and then receive the inference(s) from the server computing device again over the network.

In such scenarios, the training example(s) and/or inference(s) are required to be transmitted between the user computing device and the server computing device over a network. Such network transmission represents a data security risk as the data transmitted over the network may be susceptible to interception. In addition, such network transmission increases network traffic which can result in reduced communication speeds. Further, latency associated with transmitting the data back and forth over the network can cause delay in providing the application's services.

More recently, certain applications have included machine-learned models that are stored within the application and implemented by the application on the user device. However, this architecture is both challenging to implement and resource intensive. For example, in such scenario, the application is required to store, manage, train, and/or implement one or more machine-learned models. Inclusion of the model and corresponding support services within the application itself can increase the data size of the application, resulting in a larger memory footprint.

Machine learning within the application can also require more frequent application updates. For example, the application may need to be updated as the underlying machine learning engine is updated or otherwise advances. Application updates can undesirably require network usage and downtime for the user as the update is downloaded and installed.

Furthermore, machine learning within the application can also complicate application development, as additional services need to be built into the application itself. Thus, developers may be required to learn and stay abreast of the intricacies of different machine learning engines.

SUMMARY

Aspects and advantages of embodiments of the present disclosure will be set forth in part in the following description, or can be learned from the description, or can be learned through practice of the embodiments.

One example aspect of the present disclosure is directed to a computer-implemented method. The method includes receiving, by a computing device, one or more first new training examples from a first application of a plurality of applications stored on the computing device. The method also includes storing, by the computing device, the one or more first new training examples in a centralized example database of the computing device, wherein the centralized example database is configured to store training examples for retraining one or more machine learned models stored on the computing device. The method also includes receiving, by the computing device, a notification based on data input from a user indicating that additional training examples are no longer to be added to the centralized example database. The method also includes receiving, by the computing device, one or more second new training examples from the first application of a plurality of applications stored on the computing devices, wherein the one or more second new training examples are received after receipt of the notification. In response to receipt of the notification, the method also includes ceasing, by the computing device, storing of the one or more second new training examples in the centralized example database of the computing device.

Another example aspect of the present disclosure is directed to a computing device including one or more processors and one or more non-transitory computer-readable media that store one or more applications implemented by the one or more processors, at least one machine-learned model, a centralized example database, and instructions that, when executed by the one or more processors, cause the computing device to perform operations. The centralized example database stores training examples received from the one or more applications, and is configured to store training examples for retraining the at least one machine-learned model. The operations include receiving one or more first new training examples from a first application of the one or more applications. The operations also include storing the one or more first new training examples in the centralized example database. The operations also include receiving a notification based on data input from a user indicating that additional training examples are no longer to be added to the centralized example database. The operations also include receiving one or more second new training examples from the first application of the one or more applications, wherein the one or more second new training examples are received after receipt of the notification. In response to receipt of the notification, the operations also include ceasing storing of the one or more second new training examples in the centralized example database. The operations also include retraining the at least one machine-learned model based at least in part on the training examples stored by the centralized example database, wherein the at least one machine-learned model is retrained based at least in part on the one or more first new training examples but not on the one or more second new training examples.

Another example aspect of the present disclosure is directed to one or more non-transitory computer-readable media that collectively store instructions that, when executed by one or more processors, cause a computing device to implement an on-device machine learning platform that performs operations. The operations include providing a user interface to a user of a computing device. The user interface is configured to receive data input from the user indicating whether to operate one or more applications on the computing device in a first collection mode or a second collection mode. The first collection mode corresponds to one in which training examples based on user interaction with the one or more applications are to be used for retraining at least one machine-learned model. The second collection mode corresponds to one in which training examples based on user interaction with the one or more applications are not to be used for retraining the at least one machine-learned model. The operations also include retraining the at least one machine-learned model based at least in part on training examples received while the one or more applications operated in the first collection mode but not training examples received while the one or more applications operated in the second collection mode.

Other aspects of the present disclosure are directed to various systems, apparatuses, computer program products, non-transitory computer-readable media, user interfaces, and electronic devices.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

BRIEF DESCRIPTION OF THE DRAWINGS

Detailed discussion of embodiments directed to one of ordinary skill in the art is set forth in the specification, which makes reference to the appended figures, in which.

DETAILED DESCRIPTION

Generally, the present disclosure is directed to systems and methods for on-device machine learning. In particular, the present disclosure is directed to an on-device machine learning platform and associated techniques that enable on-device prediction, training, example collection, and/or other machine learning tasks or functionality as a centralized service to clients (e.g., to applications on the device via one or more application programming interfaces (APIs)). In addition, in some implementations, the on-device machine learning platform can include a mode controller that allows a user to provide data input indicating whether to operate one or more applications on the device in a first collection mode (e.g., permission mode) for storing training examples or a second collection mode for (e.g., incognito mode) for not storing training examples. The training examples can be generated based on user interaction with the one or more applications and used to personalize one or more machine-learned models used by the application(s) by retraining the models using the user-specific training examples. By providing a mode controller and dynamically determined accumulation of training examples, the disclosed systems and methods can advantageously accommodate user privacy when desired as well as improve accuracy of machine-learned model customization when an application or device is operating in different contexts (e.g., by different users, for different purposes, etc.).

More particularly, a computing device such as, for example, a mobile computing device (e.g., smartphone) can store or otherwise include one or more applications (e.g., mobile applications). The computing device can also include and implement the on-device machine learning platform and one or more machine-learned models. For example, the machine-learned models can be stored by the device in a centralized model layer managed by the platform.

In some implementations, on-device machine-learned models can be accessed by an application by communicating with the on-device machine learning platform via a client/service relationship. In particular, in some implementations, the machine-learning platform can be a standalone multi-tenant service which can be referenced by applications. As such, a given application is not required to store, manage, train, and/or implement machine-learned model(s) but can instead simply communicate with the on-device machine learning platform to request and receive inferences from the model(s). In some implementations, the applications can communicate with the on-device machine learning platform via one or more machine learning application programming interfaces (APIs). Example APIs include but are not limited to a collection API, a training API, and/or a prediction API.

According to another aspect of the present disclosure, the computing device can further include a centralized example database that stores training examples received from the one or more applications. In particular, the on-device machine learning platform can receive training examples from the applications via a collection API and can manage storage of the examples in the centralized example database. For example, each application that is a client or tenant of the platform can have its own collection(s) of examples stored within the centralized example database and the collection(s) can be supplemented and/or managed in an online fashion.

In some implementations, the on-device machine learning platform can cause dynamically managed storage of new training examples received from an application (e.g., within its corresponding collection) according to one or more collection modes associated generally with the device or more specifically with the application providing the training example. As one example, the collection API can include or otherwise be in communication with a mode controller that is configured to receive data input from a user indicating whether to operate one or more applications on the device in a first collection mode or a second collection mode. A first collection mode (e.g., a permission mode) can correspond to one in which training examples based on user interaction with the application are to be used for retraining at least one machine-learned model (e.g., a machine-learned model included in or otherwise accessed by the application). A second collection mode (e.g., an incognito mode) can correspond to one in which training examples based on user interaction with the application are not to be used for retraining the at least one machine-learned model.

More particularly, in some implementations, a mode controller can provide a user interface for receiving data input from a user regarding a desired collection mode. In some implementations, a mode UI can receive data input from the user indicating that training examples are not to be added to a centralized example database. More particularly, in some implementations, a mode UI can provide a selectable interface element that allows a user to toggle between two modes (e.g., a first collection mode and a second collection mode) for all applications operating on the computing device. In some implementations, a mode UI can offer a user more fine-grained control of applications operating on the computing device by providing multiple selectable interface elements that allow a user to toggle between two modes (e.g., a first collection mode and a second collection mode) for one or more respective applications operating on the computing device. In this way, data input received from the user via a mode UI can further enhance model training by identifying when and how to obtain the most appropriate training examples for personalizing machine-learned models used by applications on the user's device.

Multiple factors may lead to a user's desire to operate his device/application in an incognito mode such that training examples are not used for retraining an on-device machine-learned model or for updating machine-learned models on other devices. For example, an incognito mode may help secure personalized information gathered and provided to a machine-learned model as part of improving application performance. For instance, a messaging application might use recipient(s) and contents of messages as samples to a machine-learned model to improve automatic recipient selection based on the message content. Alternatively, a mapping application might add the location and travel patterns of a user as samples to a machine-learned model to predict travel goals in the future. Still further, a browsing application might add visited websites as samples to a machine-learned model to predict which websites to prefetch for faster browsing. Although the personalized data itself would not typically be shared beyond the device, updated functionality of a machine-learned model could potentially leak information about the samples which can form part of collected training examples.

In another example, an incognito mode may help accommodate device and/or application operation in different contexts. For example, a computing device can operate in different contexts when such device has multiple users who interact with the device in different respective ways. For instance, a main user of the computing device may permit another individual (e.g., a guest user) to interact with the computing device; interaction between the guest user and the computing device will usually be unrepresentative of interaction between the main user and the computing device. In a second example, a computing device can operate in different contexts when a single user interacts with the computing device in different manners at different times. For instance, a given user may interact with the computing device in a certain manner during working hours and in a different manner during leisure hours. In both these example contexts, data describing one of the contexts for user interaction with the computing device would, if used to train a machine-learned model which is employed in a different context of user interaction, bias the machine-learned model, and lead to impaired performance of the machine-learned model in one or both of the different user interaction contexts.

In some implementations, a computing device configured to operate in a first collection mode can receive one or more first new training examples from an application stored on a computing device. The application may be one of many applications stored on and executed by the computing device. Any first new training examples received while the computing device is operating in the first collection mode can be stored in a centralized example database of the computing device. When a notification is received based on user input indicating that additional training examples are no longer to be added to the centralized example database (e.g., based on user input that toggles between the first collection mode and a second collection mode), receipt and storage of new training examples can change. More particularly, when one or more second new training examples are received from the application after receipt of such notification, the computing device can cease storing new training examples in the centralized example database such that none of the one or more second new training examples are stored therein.

In accordance with another aspect of the present disclosure, when a device and/or application is operating in incognito mode, the machine-learning platform can be configured to not expose whether training examples were actually added or not to an application calling the training examples. Otherwise, the application could detect whether machine learning incognito mode is on or not, then cache training examples locally so that they can be re-added to the centralized example database once incognito mode is turned off again, undermining the purpose of the mode controller. As such, in some implementations, when a query request is received from a requesting application requesting information associated with a status of the training examples stored in the centralized example database, a status update can be provided in response to the query request that is consistent with all training examples having been added to the centralized example database. More particularly, in some implementations, the query request can include a total count of new training examples received by the computing device, wherein the total count includes both the one or more first new training examples received while the computing device and/or application was operating in a first collection mode and the one or more second training examples received while the computing device and/or application was operating in a second collection mode (e.g., incognito mode).

According to yet another aspect of the present disclosure, the applications can communicate with the on-device machine learning platform via a training API to cause retraining or updating of a machine-learned model based on training examples stored in the centralized example database. More particularly, machine-learned models can be retrained in order to improve and/or personalize such models based on training examples obtained at a specific computing device. However, the machine-learned models can be retrained using only one or more first new training examples received while operating in a first collection mode and excluding one or more second training examples received while operating in a second collection mode. As an example, in some implementations, given a URI for a training plan (e.g., instructions for training the model), the on-device machine learning platform can run training of the model (e.g., by interacting with a machine learning engine to cause training of the model by the engine) based on previously collected one or more first training examples. For example, the training can be performed in the background at scheduled times and/or when the device is idle.

After retraining of the model, the retrained model can be used to provide inferences. For example, an application can communicate with the on-device machine learning platform via a prediction API to provide input data and obtain inferences/predictions based on the input data from one or more of the retrained machine-learned models. Typically, these inferences will have higher accuracy since the model has been retrained on data that is specific to the user. Thus, the on-device machine learning platform can enable centralized example data collection and corresponding personalization of machine-learned models as a service to applications or other clients.

According to another aspect, in some implementations, the machine learning platform can upload logs or other updates regarding the machine-learned models to the cloud for detailed analytics of machine learning metrics. As an example, in some implementations, the on-device platform can determine an update that describes the parameters of a retrained machine-learned model or changes to the parameters of the machine-learned model that occurred during the retraining of model. The platform can transmit the update to a central server computing device (e.g., "the cloud") for aggregation with other updates provided by other computing devices. Thus, the platform can enable participation in a process known as "federated learning," in which a device determines a local update to a model based on locally stored data and then communicates the local update to a cloud service (e.g., in a privacy preserving and communication efficient manner) for aggregation to generate a global update to the model.

According to another aspect of the present disclosure, in some implementations, the on-device machine learning platform can be completely abstract from an underlying machine learning engine. For example, the machine learning engine can be a neural network library or other engine that enables implementation of machine-learned models for inference and/or training. Due to such abstraction, the machine learning platform can treat model artifacts as blobs which are generated in the cloud and then shipped to devices (e.g., via dynamic model download), where they are then interpreted by matching engines. In such fashion, the machine learning platform and its supported applications can be resilient against changes to the machine learning engine and/or agnostic/flexible to a particular engine or engine type employed.

According to another aspect, a toolkit that is complementary to the on-device platform can provide a set of tools (e.g., Python tools) to create and simulate models in the cloud before they are shipped as artifacts to devices. In some implementations, the toolkit can generate from the same source artifacts (e.g., Python source artifacts) for different versions of machine learning engines or different engine types.

In some implementations, the on-device machine-learning platform can be included in or implemented as an application, such as, for example, a mobile application. For example, in the context of the Android operating system, the on-device machine-learning platform can be included in an Android Package Kit (APK) that can be downloaded and/or updated. In one particular example, the on-device machine-learning platform can be included in or implemented as a portion of a larger application that provides a number of different support services to other applications or the device itself. For example, in addition to the on-device machine-learning platform, the larger application can provide services that enable the computing device to interact with a digital distribution service (e.g., downloading applications and/or updates from an "app store") and/or other services. In another example, the on-device machine-learning platform can be included in or implemented as a portion of the operating system of the device, rather than as a standalone application.

The systems and methods of the present disclosure provide a number of technical effects and benefits. As one example technical effect and benefit, the on-device machine-learning platform can enable personalization of machine-learned models based on locally-stored device-specific training examples, thereby leading to higher accuracy inferences. Similarly, as described elsewhere herein, the on-device platform can enable participation of the device in "federated learning," in which local updates are aggregated to generate a global update, thereby leading to improved global model accuracy for all individuals.

The present disclosure further addresses a technical problem that the performance of existing machine learning modules may be impaired when there are multiple contexts of user interaction with a computing device. For example, a computer device may have multiple users who interact with the device in different respective ways. For example, a main user of the computing device may permit another individual (e.g., a guest user) to interact with the computing device; interaction between the guest user and the device will usually be unrepresentative of interaction between the main user and the device. Data describing one of the contexts of user interaction with the system would, if used to train a machine-learned model which is employed in a different context of user interaction, bias the machine-learned model, and lead to impaired performance of the machine-learned model in one or both of the contexts of user interaction. An effect provided by certain embodiments of the present disclosure is that they make it possible for training examples representative of a first context of user interaction not to be employed in training a machine-learned model which is to be used in a second context of user interaction. Thus, the machine-learned model used in the second context has higher performance in the second context of user interaction with the computing device.

The present disclosure further addresses a technical problem relating to privacy concerns. Specifically, if data describing user interaction with a computing device is employed in a machine learning process, the resulting machine-learned model encodes that data. The way in which the encoded data is used by the machine-learned model may be unpredictable in certain instances. Furthermore, any third party who manages to obtain access to the trained machine-learned model may be able to extract from it information describing the user's interaction with the computing device. Thus, there is a technical problem that information about the user's interaction with the computing device can leak from the trained machine-learned model. Certain embodiments of the present disclosure address that problem, and therefore have the effect of improving the security of the computing device.

A still further example technical effect and benefit provides features for ensuring that applications stored on a computing device actually operate in accordance with a user's desired instructions relative to training example data collection. More particularly, it can sometimes be technically challenging to ensure that software applications running on a given computer system operate according to any requirements set by the computer system relating to confidential information. Such software applications may be provided by a commercial party who would be able to make unauthorized use of information describing user interaction with the user. The third party cannot necessarily be trusted to use such information as the user would wish, or even as the computer system may instruct the application to do. Certain embodiments of the invention have the effect of making it unnecessary to monitor the technical operation of the software applications.

As another example technical effect and benefit, the on-device machine-learning platform can provide a centralized service so that applications do not need to manage (e.g., train and/or run) machine-learned models or interact with machine-learning engines. As such, a given application is not required to store, manage, train, and/or implement machine-learned model(s) but can instead simply communicate with the on-device machine learning platform to request and receive inferences from the model(s). This can simplify the development of applications or other clients as application developers are not required to learn the intricacies of each different machine learning engine but can instead simply rely upon usage of the platform APIs.

Similar to the previous effect and benefit, the on-device machine-learning platform can also enable easy updating of a single centralized service rather than all applications. For example, when a new version or type of machine learning engine is launched, only the on-device platform is typically required to update to interact with the new engine, since the applications or other clients do not interact with the engine, but instead have the platform do so on their behalf. This can eliminate the need for applications to constantly ensure that they are compatible with the latest version(s) of machine learning engines, as they can instead rely upon the on-device platform to stay up-to-date as the engine technology advances.

As yet another example technical effect and benefit, the on-device machine-learning platform can improve communication network efficiency and usage. That is, under past paradigms where machine learning is performed by a server rather than on-device, various types of information (e.g., input data, training examples, inferences, model parameters, etc.) were required to be transmitted by the server to the device over a communications network (e.g., the Internet). However, since the present disclosure enables on-device prediction, training, example collection, and/or other machine learning tasks or functionality, such information is not required to be transmitted (at least in every instance) over a communications network. Therefore, communications network traffic, efficiency, and usage are improved.

With reference now to the Figures, example embodiments of the present disclosure will be discussed in further detail.

Example Devices and Systems

Figure 1:
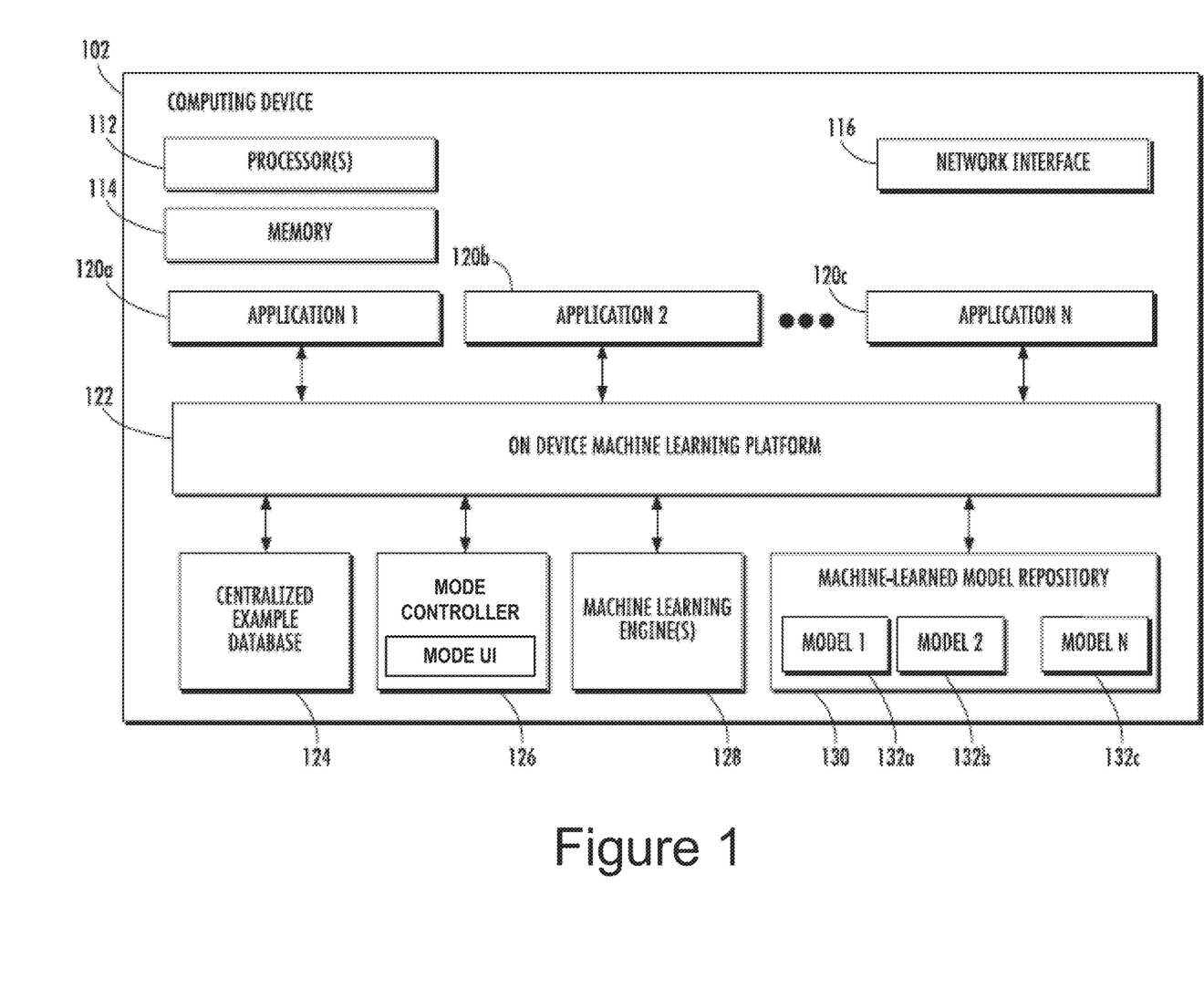
FIG. 1 depicts a block diagram of an example computing device that includes an on-device machine learning platform according to example embodiments of the present disclosure.

FIG. 1 depicts a block diagram of an example computing device 102 that includes an on-device machine learning platform 122 according to example embodiments of the present disclosure.

The computing device 102 can be any type of computing device including, for example, a desktop, a laptop, a tablet computing device, a smartphone, a computing device that is able to be worn, a gaming console, an embedding computing device, or other forms of computing devices. Thus, in some implementations, the computing device 102 can be a mobile computing device and/or a user computing device.

The computing device 102 includes one or more processors 112 and a memory 114. The one or more processors 112 can be any suitable processing device (e.g., a processor core, a microprocessor, an ASIC, a FPGA, a controller, a microcontroller, etc.) and can be one processor or a plurality of processors that are operatively connected. The memory 114 can include one or more non-transitory computer-readable storage mediums, such as RAM, ROM, EEPROM, EPROM, flash memory devices, magnetic disks, etc., and combinations thereof. The memory 114 can store data and instructions which are executed by the processor 112 to cause the computing device 102 to perform operations. The computing device 102 can also include a network interface 116 that enables communications over one or more networks (e.g., the Internet).

The on-device machine learning platform 122 can enable on-device prediction, training, example collection, and/or other machine learning tasks or functionality, which may be collectively referred to as "machine learning functions".

The on-device machine learning platform 122 may be in the form of one or more computer programs stored locally on the computing device 102 (e.g., a smartphone or tablet), which are configured, when executed by the device 102, to perform machine learning management operations which enable performance of on-device machine learning functions on behalf of one or more locally-stored applications 102a-c or other local clients. At least some of the on-device machine learning functions may be performed using one or more machine learning engines 128 implemented locally on the computing device 102. Performance of the on-device machine learning functions on behalf of the one or more locally-stored applications 120a-c or routines (which may be referred to as "clients") may be provided as a centralized service to those clients, which may interact with the on-device machine learning platform 122 via one or more application programming interfaces (APIs).

In addition, in some implementations, the on-device machine learning platform 122 can include or otherwise access a mode controller 126 that allows a user of the computing device 102 to provide data input via a mode user interface 127 indicating whether to operate one or more applications on the device in a first collection mode (e.g., permission mode) for storing training examples or a second collection mode for (e.g., incognito mode) for not storing training examples. Thus, the on-device machine learning platform 122 can enable centralized training example collection, model training, and usage of machine-learned models 132a-c as a service to applications 120a-c or other clients.

More particularly, the computing device 102 can store or otherwise include one or more applications 120a-c (e.g., mobile applications). The computing device 102 can also include and implement the on-device machine learning platform 122 and one or more machine-learned models 132a-c. For example, the machine-learned models 132a-c can be stored by the device 102 in a centralized model repository 130 that is managed by the platform 122.

According to one aspect of the present disclosure, the applications 120a-c can communicate with the on-device machine learning platform 122 via an API (which may be referred to as the "prediction API") to provide input data and obtain predictions based on the input data from one or more of the machine-learned models 132*a-c*. As an example, in some implementations, given a uniform resource identifier (URI) for a prediction plan (e.g., instructions for running the model to obtain inferences/predictions) and model parameters, the on-device machine learning platform 122 can download the URI content (e.g., prediction plan and parameters) and obtain one or more inferences/predictions by running the model (e.g., by interacting with a machine learning engine 128 to cause implementation of the model by the engine). In addition, the platform 122 can cache the content (e.g., within the repository 130) so that it can be used for subsequent prediction requests.

Thus, on-device machine-learned models 132*a-c* can be accessed by an application 120*a-c* by communicating with the on-device machine learning platform 122 via a client/service relationship. For example, a respective machine-learned model 132*a-c* can be provided for each application 120*a-c* and managed by the platform 122. In other implementations, two or more applications 120*a-c* can share a single machine-learned model 132*a-c* or a single application 120*a-c* can have two or more models 132*a-c*.

In some implementations, the machine-learning platform 122 can be a standalone multi-tenant service which can be referenced by applications 120*a-c*. As such, a given application 120*a-c* is not required to store, manage, train, and/or implement machine-learned model(s) 132*a-c* but can instead simply communicate with the on-device machine learning platform 122 to request and receive inferences from the model(s) 132*a-c*.

According to another aspect of the present disclosure, the computing device 102 can further include a centralized example database 124 that stores training examples received from the applications 120*a-c*. In particular, the on-device machine learning platform 122 can receive training examples from the applications 120*a-c* via an API (which may be referred to as the "collection API") and can manage storage of the examples in the centralized example database 124. For example, each application 120*a-c* that is a client or tenant of the platform 122 can have its own collection(s) of examples stored within the centralized example database 124 and the collection(s) can be supplemented and/or managed in an online fashion.

In some implementations, the on-device machine learning platform 122 can cause dynamically managed storage of new training examples received from an application 120*a-c* (e.g., within its corresponding collection) according to one or more collection modes associated generally with the computing device 102 or more specifically with the application 120*a-c* providing the training example. As one example, a collection API (e.g., collection API 210 of FIG. 2) associated with the on-device machine learning platform 122 can include or otherwise be in communication with a mode controller 126 that is configured to receive data input from a user via mode user interface 127 indicating whether to operate one or more applications 120*a-c* on the computing device 102 in a first collection mode or a second collection mode. A first collection mode (e.g., a permission mode) can correspond to one in which training examples based on user interaction with the application 120*a-c* are to be used for retraining at least one machine-learned model (e.g., a machine-learned model 132*a-c* included in or otherwise accessed by the application 120*a-c*), and are thus stored in centralized example database 124. A second collection mode (e.g., an incognito mode) can correspond to one in which training examples based on user interaction with the application 120*a-c* are not to be used for retraining the at least one machine-learned model 132*a-c*, and are thus not stored in centralized example database 124. More particular aspects of mode controller 126 relative to on-device machine learning platform 122 are depicted in and described relative to FIG. 2.

According to yet another aspect of the present disclosure, the applications 120*a-c* can communicate with the on-device machine learning platform 122 via an API (which may be referred to as the "training API") to cause re-training or updating of a machine-learned model 132*a-c* based on training examples stored in the centralized example database 124. As an example, in some implementations, given a URI for a training plan (e.g., instructions for training the model), the on-device machine learning platform 122 can run training of the model 132*a-c* (e.g., by interacting with a machine learning engine 128 to cause training of the model 132*a-c* by the engine 128) based on previously collected examples. For example, the training can be performed in the background at scheduled times and/or when the device is idle.

After retraining of the model 132*a-c*, the re-trained model 132*a-c* can be used to provide inferences as described elsewhere herein. Typically, these inferences will have higher accuracy since the model 132*a-c* has been re-trained on data that is specific to the user. Thus, the on-device machine learning platform 122 can enable centralized example data collection and corresponding personalization of machine-learned models 132*a-c* as a service to applications 120*a-c* or other clients.

According to another aspect, in some implementations, the machine learning platform 122 can upload logs or other updates regarding the machine-learned models 132*a-c* to the cloud for detailed analytics of machine learning metrics. As an example, in some implementations, the on-device platform 122 can determine an update that describes the parameters of a re-trained machine-learned model 132*a-c* or changes to the parameters of the machine-learned model 132*a-c* that occurred during the re-training of model 132*a-c* (e.g., a "gradient"). The platform 122 can transmit the update to a central server computing device (e.g., "the cloud") for aggregation with other updates provided by other computing devices. Thus, the platform 122 can enable participation in a process known as "federated learning," in which a device determines a local update to a model 132*a-c* based on locally stored data and then communicates the local update to a cloud service (e.g., in a privacy preserving and communication efficient manner) for aggregation to generate a global update to the model 132*a-c*.

According to another aspect of the present disclosure, in some implementations, the on-device machine learning platform 122 can completely abstract from an underlying machine learning engine 128. For example, the machine learning engine 128 can be a neural network library or other engine that enables implementation of machine-learned models 132*a-c* for inference and/or training. Due to such abstraction, the machine learning platform 122 can treat model artifacts 132*a-c* as blobs which are generated in the cloud and then shipped to devices (e.g., via dynamic model download), where they are then interpreted by matching engines 128. In such fashion, the machine learning platform 122 and its supported applications 120*a-c* can be resilient against changes to the machine learning engine 128 and/or agnostic/flexible to a particular engine 128 or engine type employed.

According to another aspect, a toolkit that is complementary to the on-device platform 122 can provide a set of tools (e.g., Python tools) to create and simulate models in the cloud before they are shipped as artifacts to devices. In some implementations, the toolkit can generate from the same source artifacts (e.g., Python source artifacts) for different versions of machine learning engines or different engine types.

In some implementations, the on-device machine-learning platform 122 can be included in or implemented as an application, such as, for example, a mobile application. For example, in the context of the Android operating system, the on-device machine-learning platform 122 can be included in an Android Package Kit (APK) that can be downloaded and/or updated. In one particular example, the on-device machine-learning platform 122 can be included in or implemented as a portion of a larger application that provides a number of different support services to other applications 120a-c or the computing device 102 itself. For example, in addition to the on-device machine-learning platform 122, the larger application can provide services that enable the computing device 102 to interact with a digital distribution service (e.g., downloading applications and/or updates from an "app store") and/or other services. In another example, the on-device machine-learning platform 122 can be included in or implemented as a portion of the operating system of the computing device 102, rather than as a standalone application.

Figure 2:
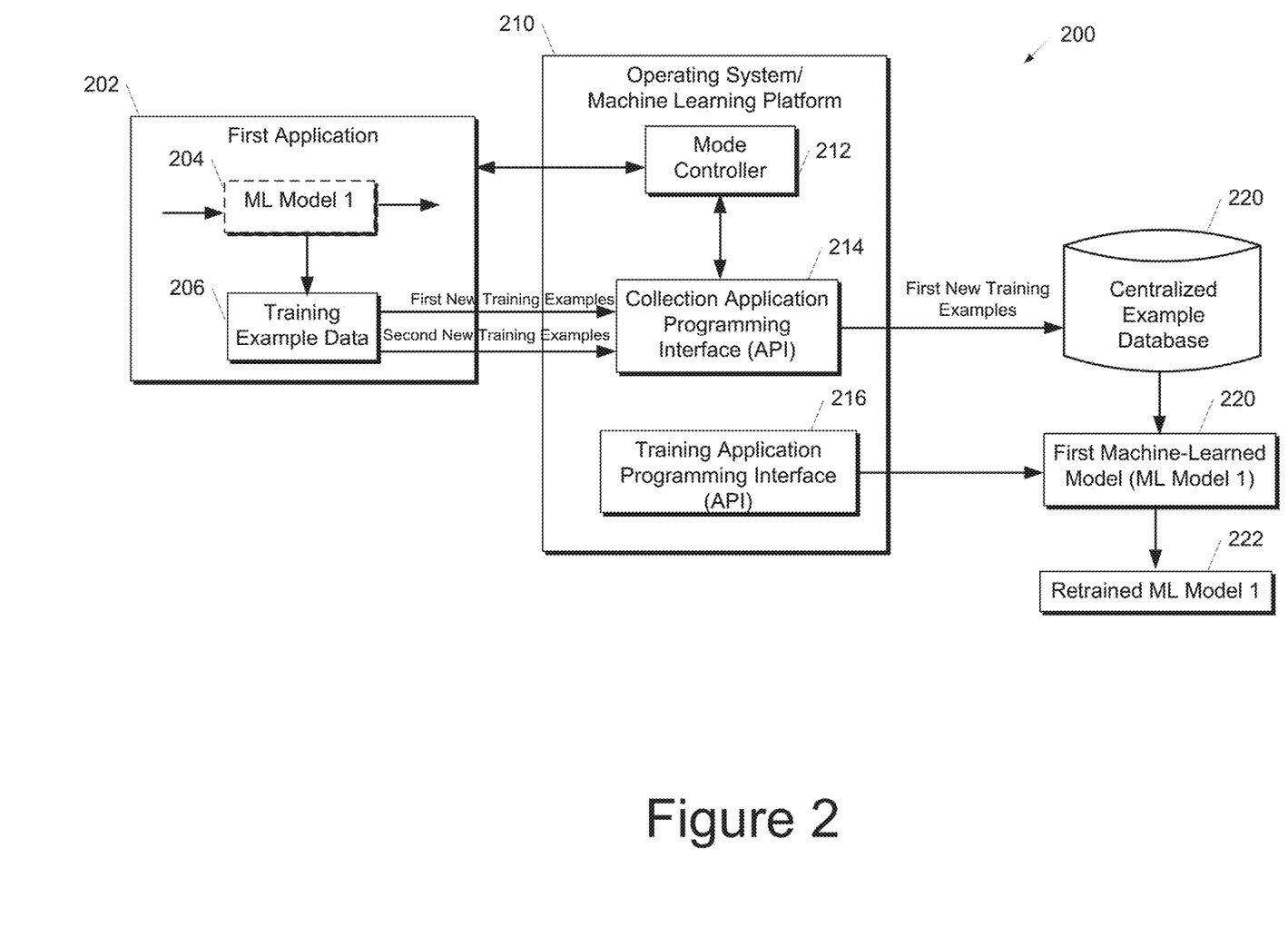
FIG. 2 depicts a flow diagram of an example machine-learned model training deployment according to example embodiments of the present disclosure.

FIG. 2 depicts a flow diagram of an example machine-learned model deployment 200 according to example embodiments of the present disclosure. Some aspects of the machine-learned model deployment 200 of FIG. 2 are similar to aspects of the computing device 102 of FIG. 1, and like reference numerals are used in such instances. More particularly, a first application 120a that is different from an operating system or associated machine learning platform 122 can be configured to run on a computing device. As part of execution of the first application 120a, the first application may include or otherwise access a first machine-learned model (ML Model 1) 132a. Although FIG. 2 only illustrates a first application 120a and first machine-learned model 132a, it should be appreciated that first application 120a may interact with multiple machine-learned models. Additionally or alternatively, a computing device may facilitate multiple applications interacting with multiple distinct machine-learned models, as depicted in FIG. 1. In some implementations, the first application 120a can communicate with the on-device machine learning platform 122 via one or more machine learning application programming interfaces (APIs). Example APIs include but are not limited to a collection API 210, a training API 212, and/or a prediction API 214.

Referring still to FIG. 2, first application 120a and/or a computing device (e.g., computing device 102) hosting first application 120a can be configured to operate in a first collection mode or a second collection mode. A first collection mode can correspond, for example, to a permission mode that permits training examples to be stored in a centralized example database 124. A second collection mode can correspond, for example, to an incognito mode blocking training examples from being stored in a centralized example database 124). More particularly, machine learning platform 122 (e.g., a machine learning platform hosted as part of an operating system on a computing device 102) can receive one or more first new training examples 204 from a first application 120a stored on a computing device 102. The first application 120a may be one of many applications (e.g., applications 120a-120c) stored on and executed by the computing device. Any first new training examples 204 received while the computing device is operating in the first collection mode can be stored in centralized example database 124 of the computing device.

When a notification is received based on user input indicating that additional training examples are no longer to be added to the centralized example database (e.g., based on user input that toggles between the first collection mode and a second collection mode as provided, for example, via mode controller 126), receipt and storage of new training examples can change. More particularly, when one or more second new training examples 206 are received from the first application 120a after receipt of such notification, the computing device can cease storing new training examples in the centralized example database 124 such that none of the one or more second new training examples 206 are stored therein.

In some implementations, receipt of the first new training example(s) 204 and/or second new training example(s) 206 by machine learning platform 122 can be coordinated by collection API 210. The first new training examples 204 and/or second new training examples 206 can be based in part on training example data 202, which can correspond to data collected during user interaction with first application 120a. For example, a user may provide input data to first application 120a that is then used as part of an implementation of first machine-learned model 132a. The output of first machine-learned model 132a coupled with the corresponding input provided thereto can be part of the training example data 202 used to determine one or more new training examples (e.g., first new training examples 204 and/or second new training examples 206).

In accordance with another aspect of the present disclosure, when a device (e.g., computing device 102) and/or application (e.g., first application 120a) is operating in incognito mode, the machine-learning platform 122 can be configured to not expose whether training examples were actually added or not to an application (e.g., first application 120a) calling the training examples. Otherwise, the application 120a could detect whether machine learning incognito mode is on or not, then cache training examples locally so that they can be re-added to the centralized example database 124 once incognito mode is turned off again, undermining the purpose of the mode controller 126.

As such, in some implementations, when a query request is received from a requesting application requesting information associated with a status of the training examples stored in the centralized example database 124, a status update can be provided in response to the query request that is consistent with all training examples having been added to the centralized example database. More particularly, in some implementations, the query request can include a total count of new training examples received by the computing device, wherein the total count includes both the one or more first new training examples 204 received while the computing device and/or application was operating in a first collection mode and the one or more second training examples 206 received while the computing device and/or application was operating in a second collection mode (e.g., incognito mode).

According to yet another aspect of the present disclosure, the applications (e.g., first application 120a) can communicate with the on-device machine learning platform 122 via a training API 212 to cause retraining or updating of a machine-learned model (e.g., first machine-learned model 132a) based on training examples stored in the centralized example database 124. More particularly, machine-learned models can be retrained in order to improve and/or personalize such models based on training examples obtained at a specific computing device. However, the machine-learned models (e.g., first machine-learned model 132a) can be retrained using only one or more first new training examples 204 received while operating in a first collection mode and excluding one or more second training examples 206 received while operating in a second collection mode. As an example, in some implementations, given a URI for a training plan (e.g., instructions for training the model), the on-device machine learning platform 122 can run training of the model (e.g., by interacting with a machine learning engine to cause training of the model by the engine) based on previously collected one or more first new training examples 204. For example, the training can be performed in the background at scheduled times and/or when the device (e.g., computing device 102) is idle.

After retraining of the model (e.g., first machine-learned model 132a), the retrained model (e.g., retrained first machine-learned model 132a') can be used to provide inferences. For example, an application (e.g., first application 120a) can communicate with the on-device machine learning platform 122 via a prediction API 214 to provide input data and obtain inferences/predictions based on the input data from one or more of the retrained machine-learned models (e.g., retrained first machine-learned model 132a'). Typically, these inferences will have higher accuracy since the model has been retrained on data that is specific to the user. Thus, the on-device machine learning platform 122 can enable centralized example data collection and corresponding personalization of machine-learned models as a service to applications or other clients.

Figure 3:
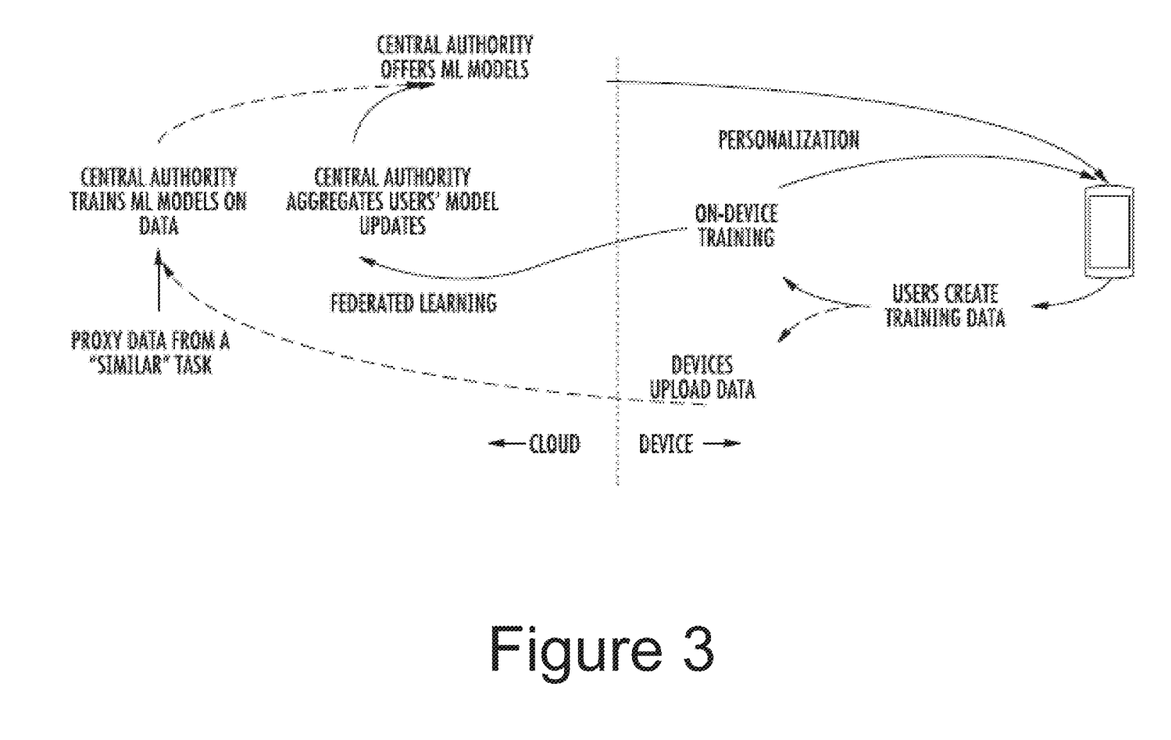
FIG. 3 depicts a graphical diagram of example personalization and federated learning data flows according to example embodiments of the present disclosure.

FIG. 3 depicts a graphical diagram of example personalization and federated learning data flows according to example embodiments of the present disclosure.

More particularly, FIG. 3 depicts three different learning data flows which may in some instances be used in a complementary fashion. In a first data flow, shown primarily in dash line at the bottom of FIG. 3, training data is generated on a user device. The training data is uploaded to a central authority which then trains or re-trains a machine-learned model based on the uploaded data. The model is then sent to the user device for use (e.g., on-device inference).

In a second data flow which can be referred to as personalization or personalized learning, the training data created on the user device is used to train or re-train the model on the device. The re-trained model is then used by such device. This personalized learning enables per-device models to be trained and evaluated without centralized data collection, thereby enhancing data security and user privacy.

In a third data flow which can be referred to as federated learning, the training data created on the user device is used to train or re-train the model on the device. Thus, the actual user-specific training data is not uploaded to the cloud, thereby enhancing data security and user privacy.

After such on device learning, the user device can provide an update to a central authority. For example, the update can describe one or more parameters of the re-trained model or one or more changes to the parameters of the model that occurred during the re-training of the model.

The central authority can receive many of such updates from multiple devices and can aggregate the updates to generate an updated global model. The updated global model can then be re-sent to the user device. This scheme enables cross-device models to be trained and evaluated without centralized data collection.

Figure 4:
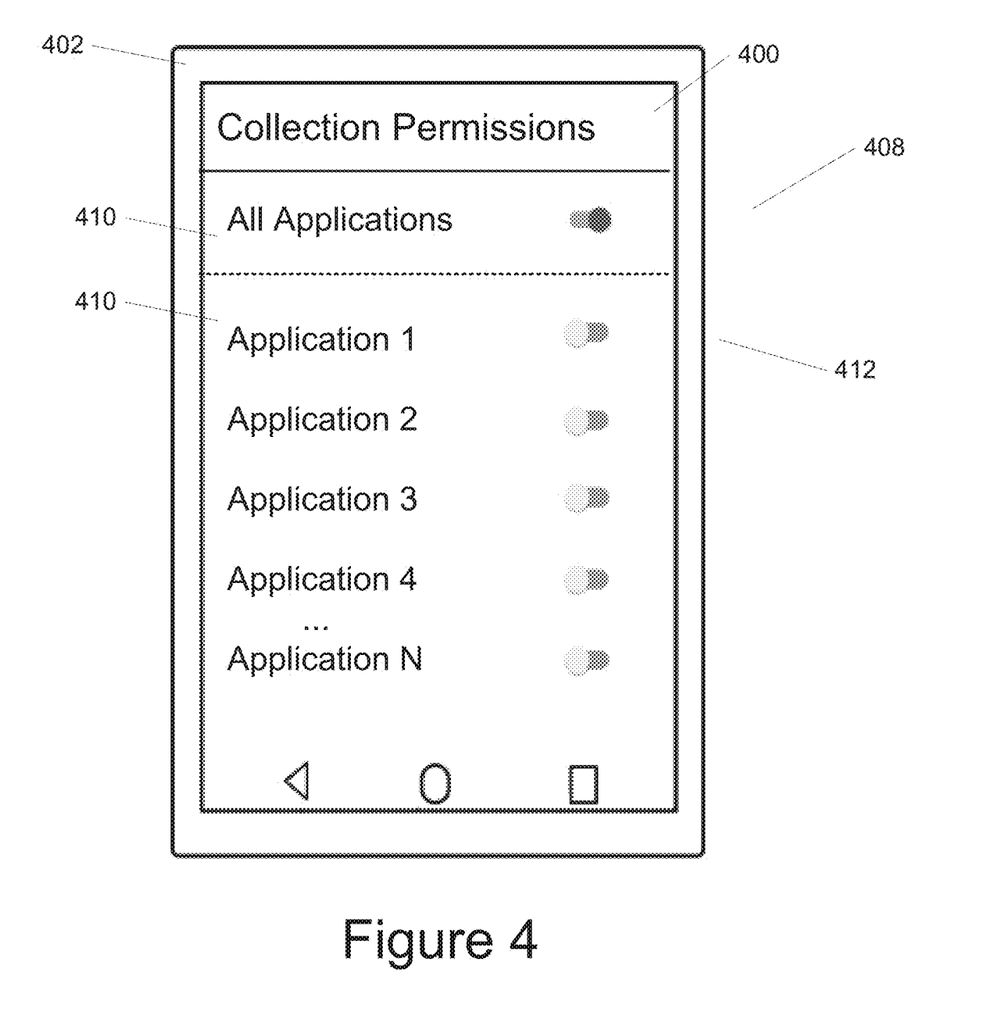
FIG. 4 depicts a block diagram of an example collection mode user interface according to example embodiments of the present disclosure.

FIG. 4 depicts a block diagram of an example collection mode user interface according to example embodiments of the present disclosure. More particularly, collection mode user interface 400 of FIG. 4 can correspond to one example embodiment of mode UI 127 of FIG. 1. In such example, mode controller 126 of FIG. 1 can provide collection mode user interface 400 for receiving data input from a user regarding a desired collection mode, the collection mode being indicative of whether training examples gathered from one or more applications are either to be added or not to be added to centralized example database (e.g., centralized example database 124 of FIG. 1).

Referring more particularly to FIG. 4, in some implementations, collection mode user interface 400 can provide interactive features by which a user of a computing device (e.g., computing device 102 of FIG. 1) can designate collection permissions 402 for the computing device generally (e.g., computing device 102) or for one or more applications (e.g., applications 120a-c). In some implementations, collection mode user interface 400 includes a selectable interface element 404 that allows a user to toggle between two modes (e.g., a first collection mode and a second collection mode) for all applications 406 operating on the computing device. Additionally or alternatively, in some implementations, collection mode user interface 400 can offer a user more fine-grained control of applications operating on the computing device by providing multiple selectable interface elements 408a-e that allow a user to toggle between two modes (e.g., a first collection mode and a second collection mode) for one or more respective applications 410a-e operating on the computing device. In this way, data input received from the user via mode collection user interface 400 can further enhance model training by identifying when and how to obtain the most appropriate training examples for personalizing machine-learned models used by applications 410 on the user's device.

Example Methods

Figure 5:
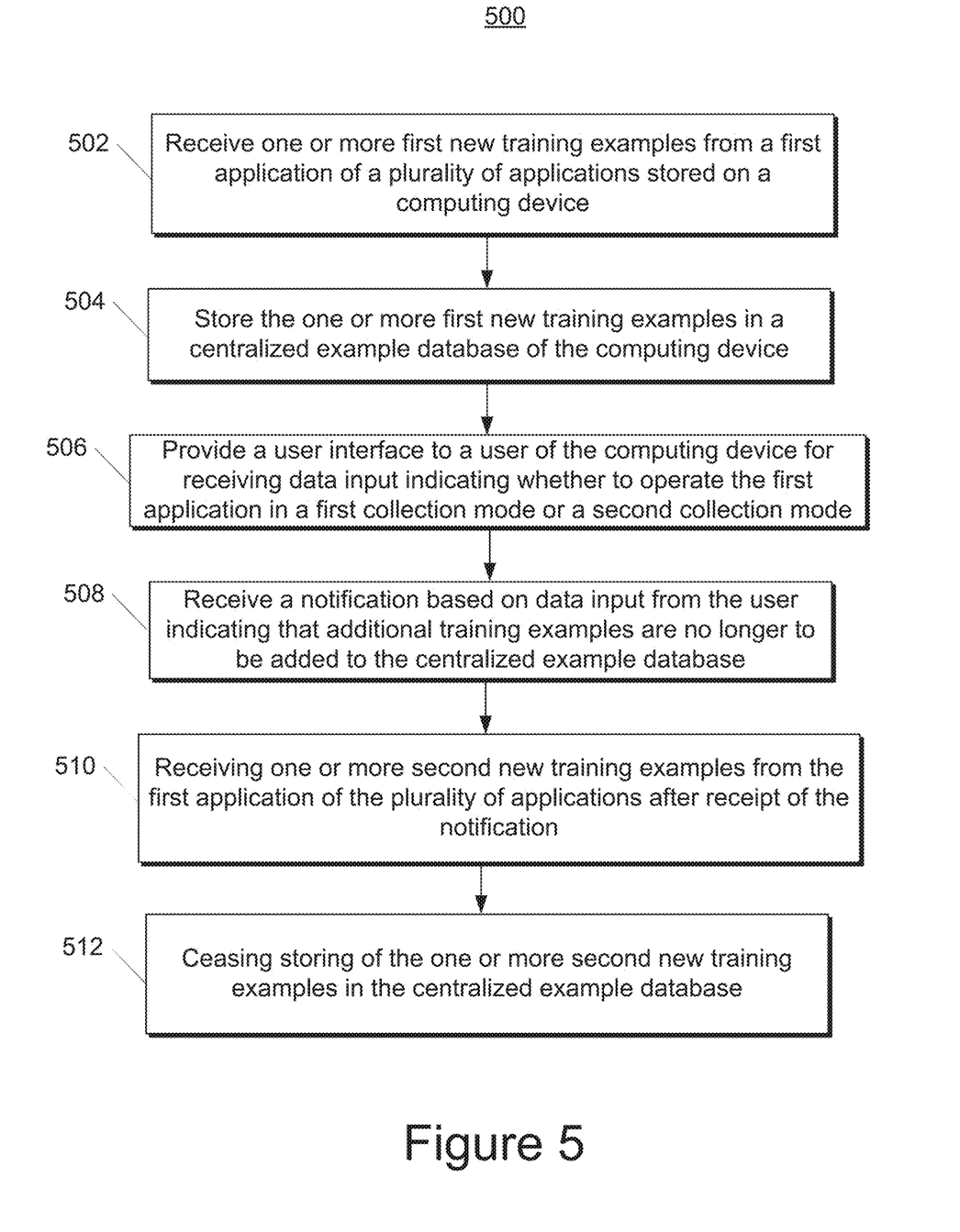
FIG. 5 depicts a flowchart of a first example method according to example embodiments of the present disclosure.

FIG. 5 depicts a flow chart of an example method 500 to collect training examples for performing machine learning according to example embodiments of the present disclosure.

At 502, a computing device can receive one or more first new training examples from a first application of a plurality of applications stored on the computing device. In some implementations, the one or more first new training examples received at 502 are based at least in part on data associated with interaction by the user with the first application stored on the computing device. In some implementations, receiving one or more first new training examples at 502 is implemented via one or more machine learning application programming interfaces of the computing device.

At 504, the computing device can store the one or more first new training examples received at 502 in a centralized example database of the computing device. The centralized example database is configured to store training examples for retraining one or more machine learned models stored on the computing device.

At 506, the computing device can provide a user interface to a user of a computing device. The user interface provided at 506 can be configured to receive data input from the user indicating whether to operate one or more applications on the computing device in a first collection mode (e.g., a permission mode permitting training examples to be stored in a centralized example database) or a second collection mode (e.g., an incognito mode blocking training examples from being stored in a centralized example database). More particularly, the first collection mode can correspond to one in which training examples based on user interaction with the one or more applications are to be used for retraining at least one machine-learned model, while the second collection mode can correspond to one in which training examples based on user interaction with the one or more applications are not to be used for retraining the at least one machine-learned model. In some implementations, the user interface provided at 506 can provide one or more selectable interface elements allowing the user to toggle between the first collection mode and the second collection mode for the one or more applications. For example, the user interface provided at 506 can correspond to mode UI 127 of FIG. 1 or collection mode user interface 400 of FIG. 4. In some implementations, the data input from a user received at 506 via a user interface available through a machine learning platform of the computing device, wherein the first application is different than the machine learning platform.

At 508, the computing device can receive a notification based on data input from a user indicating that additional training examples are no longer to be added to the centralized example database. In some implementations, the notification received at 508 can be associated with data input from a user provided via the user interface provided at 506.

At 510, the computing device can receive one or more second new training examples from the first application of a plurality of applications stored on the computing devices. The one or more second new training examples received at 510 can be received after receipt of the notification received at 508. In some implementations, the one or more second new training examples received at 510 are based at least in part on data associated with interaction by the user with the first application stored on the computing device. In some implementations, receiving one or more second new training examples at 510 is implemented via one or more machine learning application programming interfaces of the computing device.

At 512, in response to receipt of the notification at 510, the computing device can cease storing of the one or more second new training examples in the centralized example database of the computing device. In some implementations, ceasing storing of the one or more second new training examples at 512 can more particularly include transmitting, in response to receipt of the notification received at 508, a command from the machine learning platform to the first application. In response to receiving the command from the machine learning platform, the first application can interrupt one or more of receiving the one or more second new training examples from the first application or storing the one or more second new training examples in the centralized example database of the computing device.

Figure 6:
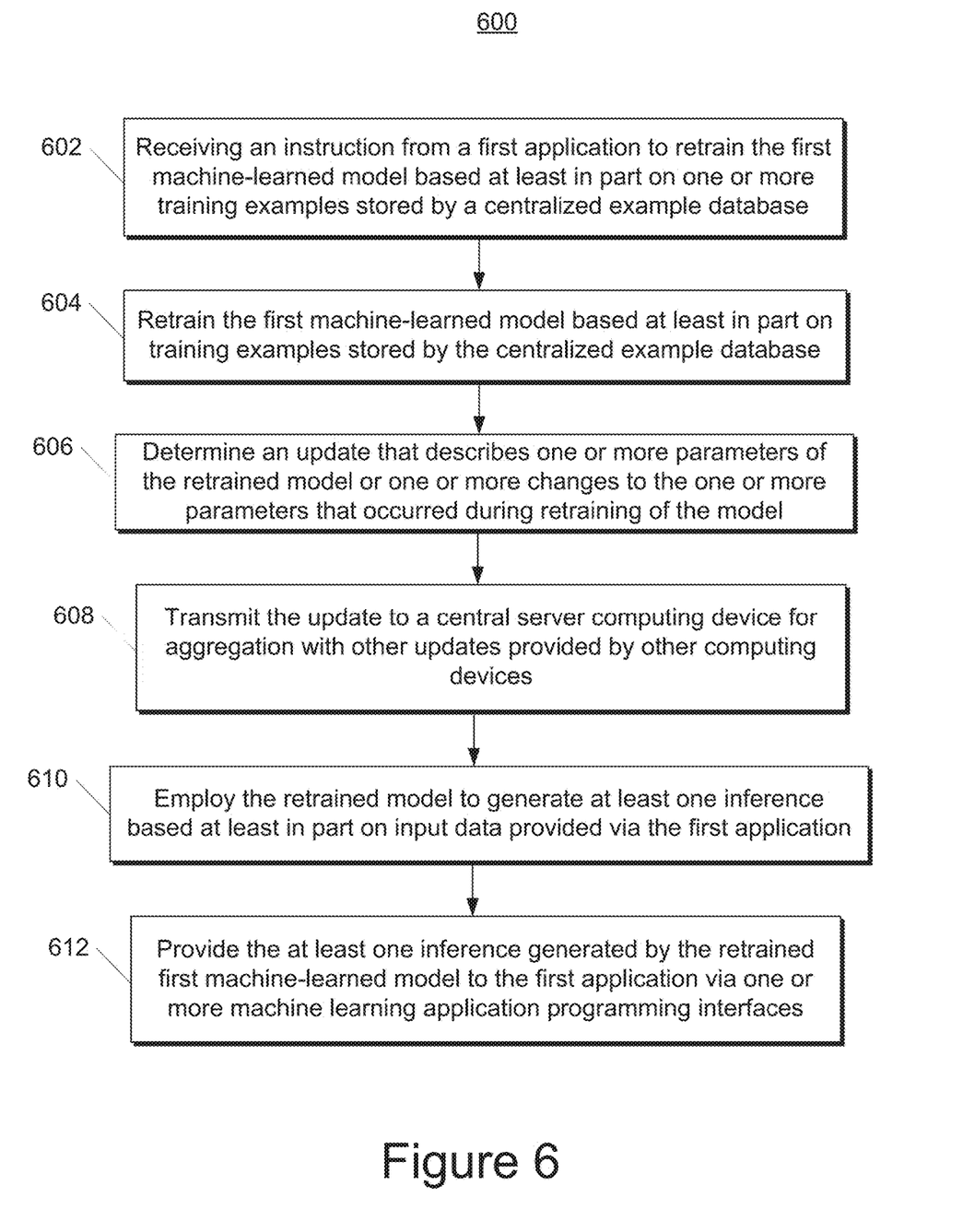
FIG. 6 depicts a flowchart of a second example method according to example embodiments of the present disclosure.

FIG. 6 depicts a flow chart of an example method 600 to implement aspects of machine learning according to example embodiments of the present disclosure.

At 602, a computing system can receive an instruction from a first application to retrain the first machine-learned model stored by the computing device based at least in part on the one or more first new training examples stored by the centralized example database.

At 604, the computing system can retrain the at least one machine-learned model based at least in part on training examples received while the one or more applications operated in the first collection mode but not training examples received while the one or more applications operated in the second collection mode. In some implementations, a computing device can cause a first machine-learned model to be retrained at 604 based at least in part on the training examples stored by the centralized example database. Implementation of machine-learned model retraining at 604 can be in response to the instruction received at 602.

At 606, the computing device can determine an update that describes one or more parameters of the first machine-learned model retrained at 604 or one or more changes to the one or more parameters of the first machine-learned model that occurred during the retraining of the first machine-learned model at 604. The update determined at 606 will not include information regarding the one or more second new training examples received (e.g., at 510) after receipt of the notification (e.g., at 508).

At 608, the computing device can transmit the update determined at 606 to a central server computing device for aggregation with other updates provided by other computing devices. The transmission of updates at 608 can be part of a federated learning approach to machine learning.

At 610, the computing device can employ the machine-learned model retrained at 604 to generate at least one inference based at last in part on input data provided via the first application.

At 612, the computing device can provide the at least one inference generated at 610 by the retrained first machine-learned model to the first application via one or more machine learning application programming interfaces (e.g., a prediction API).

Figure 7:
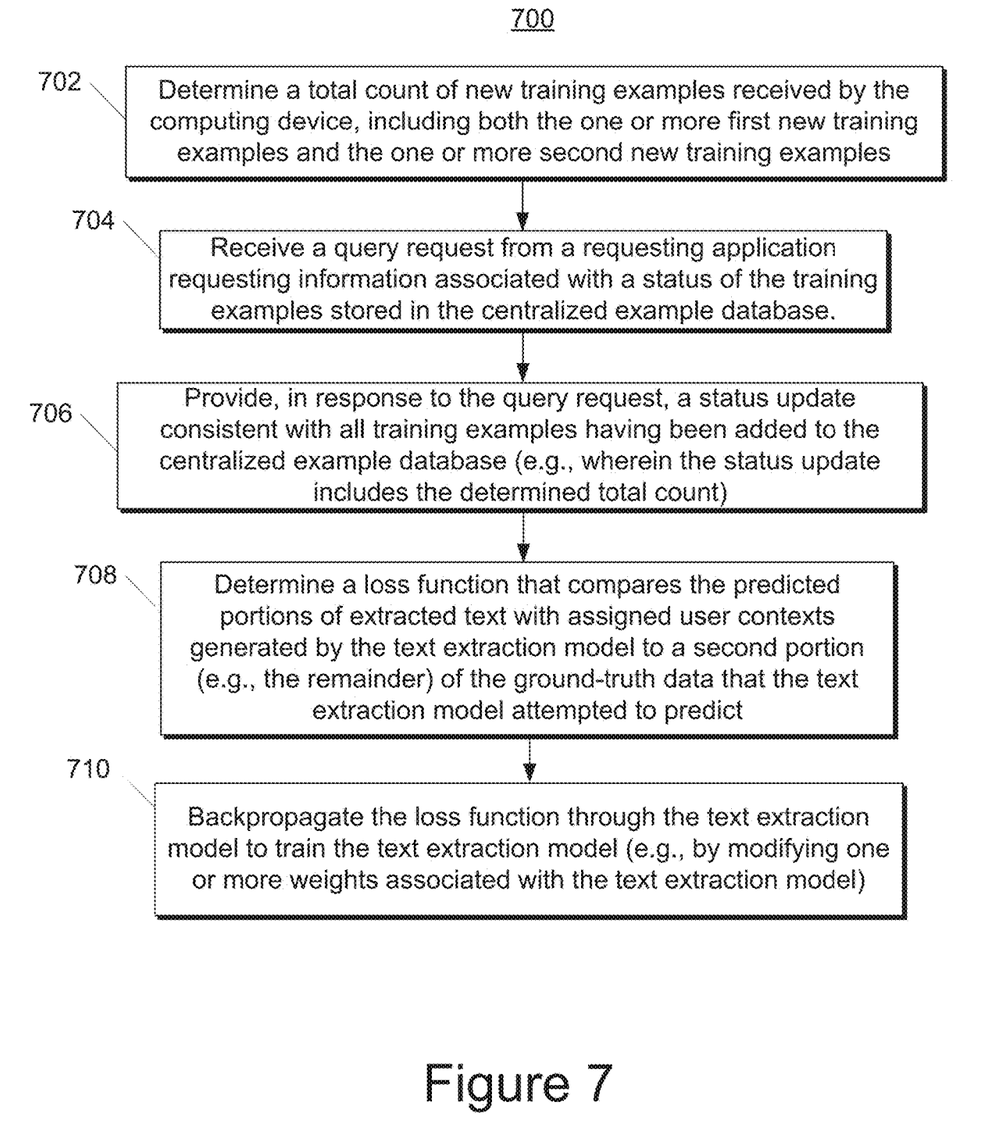
FIG. 7 depicts a flowchart of a third example method according to example embodiments of the present disclosure.

FIG. 7 depicts a flow chart of an example method 700 to implement additional aspects of machine learning according to example embodiments of the present disclosure.

At 702, a computing device can determine a total count of new training examples received by the computing device. The total count of new training examples determined at 702 can include both the one or more first new training examples (e.g., the one or more first new training examples received at 502) and the one or more second new training examples (e.g., the one or more second new training examples received at 510).

At 704, the computing device can receive a query request from a requesting application of the plurality of applications stored on the computing device. The query request can request, for example, information associated with a status of the training examples stored in the centralized database.

At 706, the computing device can provide, in response to receipt of the query request at 704, a status update to the requesting application. In some implementations, the status update provided to the requesting application at 706 can indicate a status of the centralized example database that is consistent with the one or more second new training examples received after receipt of the notification having been added to the centralized example database. In some implementations, the status update provided to the requesting application at 706 can include the total count of new training examples determined at 702.

Additional Disclosure

The technology discussed herein makes reference to servers, databases, software applications, and other computer-based systems, as well as actions taken and information sent to and from such systems. The inherent flexibility of computer-based systems allows for a great variety of possible configurations, combinations, and divisions of tasks and functionality between and among components. For instance, processes discussed herein can be implemented using a single device or component or multiple devices or components working in combination. Databases and applications can be implemented on a single system or distributed across multiple systems. Distributed components can operate sequentially or in parallel.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and equivalents to such embodiments. Accordingly, the subject disclosure does not preclude inclusion of such modifications, variations and/or additions to the present subject matter as would be readily apparent to one of ordinary skill in the art. For instance, features illustrated or described as part of one embodiment can be used with another embodiment to yield a still further embodiment. Thus, it is intended that the present disclosure cover such alterations, variations, and equivalents.

In particular, although FIGS. 5-7 respectively depict steps performed in a particular order for purposes of illustration and discussion, the methods of the present disclosure are not limited to the particularly illustrated order or arrangement. The various steps of the methods 500, 600, and 700 can be omitted, rearranged, combined, and/or adapted in various ways without deviating from the scope of the present disclosure.

What is claimed is:

1. A computer-implemented method, comprising:
    accessing, by a computing device, mode controller data input by a user of the computing device indicating whether to operate a first application of the computing device in a permission collection mode in which training examples based on a user interaction with the first application are to be used for retraining one or more machine-learned models or an incognito collection mode in which the training examples based on the user interaction with the first application are not to be used for retraining the one or more machine-learned models;
    receiving, by the computing device, a notification based on the mode controller data input from the user corresponding to the incognito collection mode, the notification indicating that additional training examples are no longer to be added to a centralized example database of the computing device; and
    in response to receipt of the notification, ceasing, by the computing device, storing of one or more new training examples in the centralized example database of the computing device.

2. The computer-implemented method of claim 1, wherein:
    the first application comprises a messaging application; and
    the training examples based on the user interaction with the first application comprise at least one of a plurality of recipients or a plurality of contents of messages associated with the messaging application.

3. The computer-implemented method of claim 1, wherein:
    the first application comprises a mapping application; and
    the training examples based on the user interaction with the first application comprise at least one of a location or a travel pattern associated with the computing device while operating the mapping application.

4. The computer-implemented method of claim 1, wherein:
    the first application comprises a browsing application; and
    the training examples based on the user interaction with the first application comprise one or more websites visited with the browsing application.

5. The computer-implemented method of claim 1, comprising:
    in response to receipt of the notification, initiating, by the computing device, operation of the first application in the incognito collection mode when a guest user is interacting with the first application and in the permission collection mode when the user is interacting with the first application.

6. The computer-implemented method of claim 1, comprising:
    in response to receipt of the notification, initiating, by the computing device, operation of the first application in the incognito collection mode when the user is interacting with the first application in a first context and in the permission collection mode when the user is interacting with the first application in a second context.

7. The computer-implemented method of claim 6, wherein the first context is associated with a first time of day and the second context is associated with a second time of day.

8. The computer-implemented method of claim 1, wherein the mode controller data input by the user is received via a user interface comprising at least one selectable interface element allowing the user to toggle between the incognito collection mode and the permission collection mode for the first application.

9. The computer-implemented method of claim 1, comprising:
    causing, by the computing device, a first machine-learned model of the one or more machine-learned models to be retrained based on the training examples.

10. The computer-implemented method of claim 9, comprising:
    employing, by the computing device, the retrained first machine-learned model to generate at least one inference based at least in part on input data provided to the first application; and
    providing, by the computing device, the at least one inference generated by the retrained first machine-learned model to the first application via one or more machine learning application programming interfaces.

11. A computing device, comprising:
    one or more processors; and
    one or more non-transitory computer-readable media that store:
        one or more applications implemented by the one or more processors;
        at least one machine-learned model;
        a centralized example database that stores training examples received from the one or more applications, the centralized example database configured to store training examples for retraining the at least one machine-learned model; and
        instructions that, when executed by the one or more processors, cause the computing device to perform operations, the operations comprising:
            accessing mode controller data input by a user of the computing device indicating whether to operate a first application of the one or more applications in a permission collection mode in which training examples based on a user interaction with the first application are to be used for retraining the at least one machine-learned model or an incognito collection mode in which the training examples based on the user interaction with the first application are not to be used for retraining the at least one machine-learned model;

receiving a notification based on the mode controller data input from the user corresponding to the incognito collection mode, the notification indicating that additional training examples are no longer to be added to the centralized example database; and in response to receipt of the notification, ceasing storing of one or more new training examples in the centralized example database of the computing device.

12. The computing device of claim 11, wherein:
the first application comprises a messaging application; and
the training examples based on the user interaction with the first application comprise at least one of a plurality of recipients or a plurality of contents of messages associated with the messaging application.

13. The computing device of claim 11, wherein:
the first application comprises a mapping application; and
the training examples based on the user interaction with the first application comprise at least one of a location or a travel pattern associated with the computing device while operating the mapping application.

14. The computing device of claim 11, wherein:
the first application comprises a browsing application; and
the training examples based on the user interaction with the first application comprise one or more websites visited with the browsing application.

15. The computing device of claim 11, wherein the computing device is configured to operate the first application in the incognito collection mode when a guest user is interacting with the first application and in the permission collection mode when the user is interacting with the first application.

16. The computing device of claim 11, wherein the computing device is configured to operate the first application in the incognito collection mode when the user is interacting with the first application in a first context and in the permission collection mode when the user is interacting with the first application in a second context.

17. The computing device of claim 16, wherein the first context is associated with a first time of day and the second context is associated with a second time of day.

18. The computing device of claim 16, the operations comprising:
initiating retraining of the at least one machine-learned model based on the training examples;
employing the retrained at least one machine-learned model to generate at least one inference based at least in part on input data provided to the first application; and
providing the at least one inference generated by the retrained at least one machine-learned model to the first application via one or more machine learning application programming interfaces.

19. One or more non-transitory computer-readable media that store instructions that, when executed by one or more processors, cause a computing device to perform operations, the operations comprising:
providing a user interface to a user of a computing device, the user interface configured to receive data input from the user indicating whether to operate a first application in a permission collection mode in which training examples based on user interaction with the first application are to be used for retraining at least one machine-learned model or an incognito collection mode in which the training examples based on user interaction with the first application are not to be used for retraining the at least one machine-learned model;
receiving mode data from the user interface corresponding to the incognito collection mode, the mode data indicating that additional training examples are no longer to be added to a centralized example database; and
in response to receipt of the mode data, ceasing storing of one or more new training examples in the centralized example database of the computing device.

20. The one or more non-transitory computer-readable media of claim 19, wherein the user interface provided to the user of the computing device provides one or more selectable interface elements allowing the user to toggle between the incognito collection mode and the permission collection mode for the first application.

* * * * *